F. B. STIRCKLER.
FASTENER.
APPLICATION FILED DEC. 10, 1917.
1,318,303.
Patented Oct. 7, 1919.
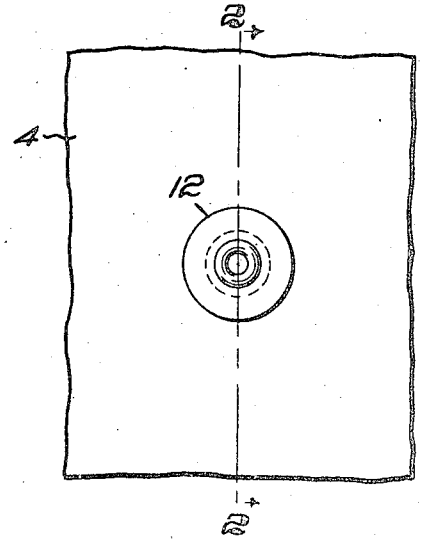
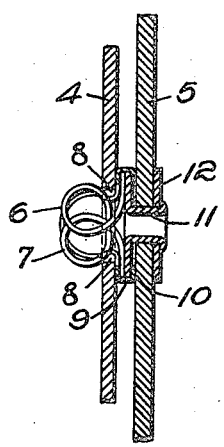
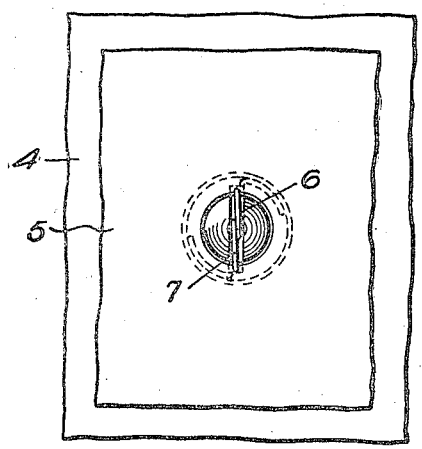
Inventor:
Frank B. Stirckler.
by Emery, Booth, Janney & Varney
Attys.

UNITED STATES PATENT OFFICE.

FRANK B. STIRCKLER, OF BOSTON, MASSACHUSETTS, ASSIGNOR TO CARR FASTENER COMPANY, OF CAMBRIDGE, MASSACHUSETTS, A CORPORATION OF MAINE.

FASTENER.

1,318,303.　　　　Specification of Letters Patent.　　Patented Oct. 7, 1919.

Application filed December 10, 1917. Serial No. 206,388.

*To all whom it may concern:*

Be it known that I, FRANK B. STIRCKLER, a citizen of the United States, and a resident of Dorchester, city of Boston, in the county of Suffolk, Commonwealth of Massachusetts, (whose post-office address is 33 Kenberma road, Dorchester, Massachusetts,) have invented an Improvement in Fasteners, of which the following description, in connection with the accompanying drawings, is a specification, like characters on the drawings representing like parts.

This invention relates to improvements in separable fasteners, and more particularly, though not exclusively, to stud and socket fasteners wherein a stud having an expansible head is adapted to coöperate with a socket having an aperture of fixed dimensions.

Referring to the drawings:—

Figure 1 is a front elevation of a preferred form of fastener constituting one embodiment of my invention;

Fig. 2 is a section thereof, partly in elevation, on the line 2—2 of Fig. 1; and Fig. 3 is an elevation thereof taken from the opposite side of the fastener from the elevation shown in Fig. 1.

I have elected to show my invention in connection with the securing of a curtain to the body of an automobile, and in the drawings I have shown the socket as a round hole in the sheet metal side 4 of the body of the car, and I have shown the stud attached to an automobile curtain 5. In the preferred form of my invention selected for illustrative purposes, I have shown a hollow stud preferably pressed from sheet metal and having a slot in the end thereof to permit the passage therethrough of yielding jaw means, preferably as shown formed of resilient wire 7 and providing two coils adapted to project on opposite sides of the head 6 of the stud and to engage the sides 8 of the aperture forming the socket. The preferred form of double coil shown in the drawings is peculiarly desirable because the strain on the wire is well distributed, and the wire will not be likely to snap, as is very frequently the case with stud and socket fasteners in which the head of the stud is expansible. In the embodiment of my invention shown in the drawings, the head 6 is provided with an annular flange 9 adapted to engage a flange 10 having a tubular projection 11 adapted to pass through the curtain 5 and to be riveted over a plate 12 on the opposite side of the curtain 5. The ends of the resilient wire forming the expansible portions of the head are preferably held between the flanges 9 and 10, while being positioned laterally by the sides of the slot in the head 6 through which the socket-engaging portions project.

Thus the resilient portion of the stud is to a large extent supported and relieved of strain by the non-resilient portions of the stud. The curves of the loops in the resilient portion of the stud are such that when the stud is pressed against the aperture forming the socket to enter the stud therein, the sides of the resilient loops will be pressed inwardly, thus permitting the stud to enter the socket, and will immediately thereafter spring outwardly to engage the sides of the aperture interiorly of the socket and to strongly resist separation of stud and socket while holding the stud and socket pressed closely together under yielding pressure to prevent rattling. Separation of stud and socket may, however, be readily effected by an outward pull on the curtain 5, especially when said outward pull is in a general direction axial of the stud.

While I have shown and described one embodiment of my invention, it will be understood that changes involving omission, alteration, substitution and reversal of parts, and even changes in the mode of operation, may be made without departing from the scope of my invention, which is best defined in the following claims:

1. A stud and socket fastener comprising, in combination, a socket, and a stud having a head portion of fixed proportions having a slot extending across the end thereof and a resilient element projecting through said slot for engagement with the socket.

2. A stud and socket fastener comprising, in combination, a socket, and a stud having a head portion of fixed proportions having a slot therein and a wire forming a complete coil and having an intermediate portion of said coil projecting through said slot for engagement with the socket.

3. A stud and socket fastener comprising, in combination, a socket, and a stud having a head portion of fixed proportions having a slot therein and a complete double coil of wire the spires thereof projecting through said slot for engagement with the socket.

4. A stud and socket fastener comprising, in combination, a socket, and a stud having a head portion of fixed proportions having a slot therein and providing a rearwardly extending flange, a second flange for engagement by the first named flange, and a resilient element projecting through the slot in said head for expansive engagement with the sides of said socket.

5. A stud and socket fastener comprising, in combination, a socket, a stud therefor having an expansible head comprising a fixed portion having a slot therein, and a coiled resilient element projecting through said slot and having its ends clamped between flanges in the body portion of the stud.

6. A stud and socket fastener comprising, in combination, a socket, and a stud having a tubular shank having a slot extending completely across the end thereof and means projecting through said slot, and resiliently urged outwardly relative to the tubular shank to provide a collapsible enlarged head for the stud opposing withdrawal of the stud from the socket.

In testimony whereof, I have signed my name to this specification.

FRANK B. STIRCKLER.